(12) United States Patent
Pearson et al.

(10) Patent No.: US 6,535,914 B1
(45) Date of Patent: Mar. 18, 2003

(54) METHOD FOR REPEATING A SCAN OPERATION IN A NETWORK

(75) Inventors: Daniel R. Pearson, Roseville, CA (US); David A. Kumpf, Rocklin, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/404,965

(22) Filed: Sep. 24, 1999

(51) Int. Cl.[7] .............................................. G06F 15/177
(52) U.S. Cl. ...................... 709/220; 709/218; 709/222; 710/8; 710/10; 710/15; 710/19
(58) Field of Search ................................ 709/203, 217, 709/218, 219, 223, 246, 220; 710/8, 10, 15–19

(56) References Cited

U.S. PATENT DOCUMENTS

| 5,872,974 A | * | 2/1999 | Mezick ....................... 395/701 |
| 5,944,781 A | * | 8/1999 | Murray ....................... 709/202 |
| 6,049,673 A | * | 4/2000 | McComb et al. ............. 395/712 |
| 6,149,323 A | * | 11/2000 | Shima .......................... 400/76 |
| 6,188,807 B1 | * | 2/2001 | Arakawa ...................... 382/319 |
| 6,256,662 B1 | * | 7/2001 | Lo et al. ...................... 709/203 |
| 6,351,751 B1 | * | 2/2002 | Traversat et al. ........ 707/103 Y |

FOREIGN PATENT DOCUMENTS

| EP | 0 461 920 | 12/1991 | |
| JP | 408221227 A | * 8/1996 | .............. G06F/3/12 |

* cited by examiner

Primary Examiner—Zarni Maung
Assistant Examiner—Jinsong Hu

(57) ABSTRACT

A method for repeating a previous scan operation in a network having a server connected to at least one scanner and at least one client includes saving the scan parameters of the previous scan operation received by the server from the client when a request to perform the previous scan operation is received from the client. The scan parameters of the previous scan operation is displayed when the client queries the server for scan parameters for a present scan operation, and the present scan operation is initiated using the scan parameters of the previous scan operation.

12 Claims, 3 Drawing Sheets

METHOD FOR REPEATING A SCAN OPERATION IN A NETWORK

The present invention generally relates to software and firmware for controlling the scan function of a scan peripheral, and more particularly to software and firmware for repeating a scan operation of a peripheral connected to a network using previously used scan parameters.

Scan peripherals are becoming a larger segment of the peripheral industry. Users find such peripherals useful as a means of input for text, graphics and images. Some peripherals combine scanning with other functions. These multifunction peripherals are popular, in part, because of their ability to combine multiple useful functions into a single device. Increasingly, the scan and/or multifunction peripherals are implemented in a network so that their services are accessible to a more than one client. When connected to the network, the peripherals are operationally connected to the clients via a dedicated peripheral server, which includes software and firmware for allowing the clients to interact with the peripherals using a web browser. Such software and firmware are disclosed in commonly assigned U.S. patent application Ser. No. 09/163,791 filed Sep. 30, 1998 by Kumpf et al., now U.S. Pat. No. 6,289,371, which application is incorporated by reference herein.

Generally, the invention disclosed in the Kumpf et al. application provides an interactive networked client-server scan method launched and actively managed through a web browser interface on a client. A server responds to a universal resource locator (URL) address identifying the server with a general purpose format software program that creates an interface in the client web browser and enables the client to interact with the server in initiating, altering and monitoring scan jobs and related data.

One shortcoming of the known scan peripherals, whether a stand alone type scan peripheral or a multifunction peripheral, is that they do not have the ability to repeat a previously performed scan operation. In other words, the scan parameters, i.e., paper size, resolution, image type and image format, for example, in these peripherals for performing a scan operation are set to the manufacturer's default settings. As such, the scan parameters must be changed by the user (through the client) for every scan job when the desired scan parameters differ from the default scan parameters, which is inconvenient to the user.

Accordingly, it is an object of the present invention to provide an improved method which enables a peripheral connected to a network to automatically repeat the previously performed scan operation without requiring the user to reset the scan parameters to those used in the previous scan operation.

It is a further object of the present invention to provide such a method in which the scan parameters of a scan operation are automatically stored and used as the parameters for the next scan operation.

Another object of the present invention is to provide such an improved method which determines whether a peripheral newly connected to a network peripheral server is the same type as the peripheral which performed the previous scan operation.

Yet another object of the present invention is to provide such an improved method in which the scan parameters used in the previous scan operation are retained if the newly connected peripheral is determined to be of the same type as the previously connected peripheral, and are reset to the default scan parameters of the new peripheral if the newly connected peripheral is of a different type than the previously used peripheral.

Other objects, features and advantages will become apparent upon reading the following detailed description, in conjunction with the attached drawings.

DETAILED DESCRIPTION

The present invention is directed to a method for automatically storing the scan parameters used in a previous scan operation and using these stored parameters in performing the next scan operation, thereby eliminating the inconvenience of having to manually reset the scan parameters to the values used in the previous scan job each time it is desired to repeat the previous scan operation.

Broadly stated, the present invention is directed to a method for repeating a previous scan operation in a network having a server connected to at least one scanner and at least one client. The method includes saving scan parameters of the previous scan operation received by the server from the client when a request to perform the previous scan operation is received from the client. The scan parameters of the previous scan operation are displayed when the client queries the server for scan parameters for a present scan operation, and then the present scan operation is initiated using the scan parameters of the previous scan operation.

The present invention also relates to a server for operating a scanner in a network having at least one client. The server is connected to the scanner via the network and is adapted to repeat a previous scan operation. The server includes a memory for storing scan parameters of the previous scan operation received from the client, when a request to perform the previous scan operation is received from the client. A program provides the scan parameters of the previous scan operation to the client when the client queries the server for scan parameters for a present scan operation. The client initiates the present scan operation using the scan parameters of the previous scan operation responsive to a request for the present scan operation from the user.

Figure 1:
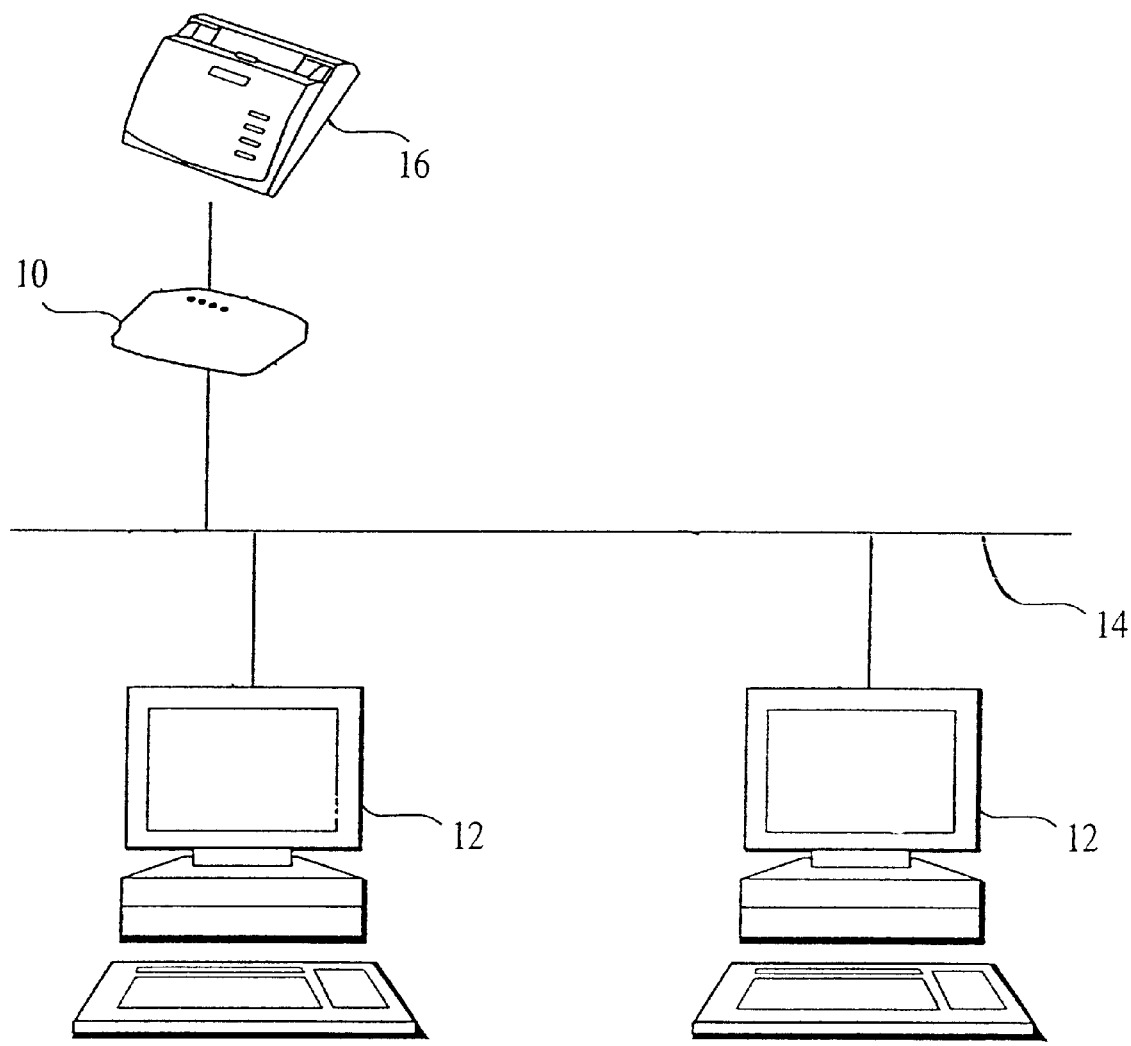
FIG. 1 is an overview of a network system in which the present method is preferably applied.

Turning now to the drawings, and particularly FIG. 1, the present invention is implemented in a network system including a network peripheral server 10 such as a Hewlett-Packard JETDIRECT box. The JETDIRECT box is shown and described in a Hewlett-Packard user manual part no. 5967-2290, and is incorporated by reference herein. It should be understood, however, that the functions of the server 10 can be performed, for example, as part of a card that connects via a bus interface to the peripheral, or as part of an internal central processing unit (CPU) of an attached network peripheral. The server 10 is connected to a plurality of clients 12, which are typically and preferably personal computers (PC), via a network 14. The server also operatively connects the clients to a scanner 16, which may be a stand alone scan peripheral or a multifunction peripheral (MFP) that performs various functions such as printing and scanning. The server 10 connects to a network port through a network interface unit (not shown) in a known manner and permits clients 12 to access the scanner 16.

Figure 2:
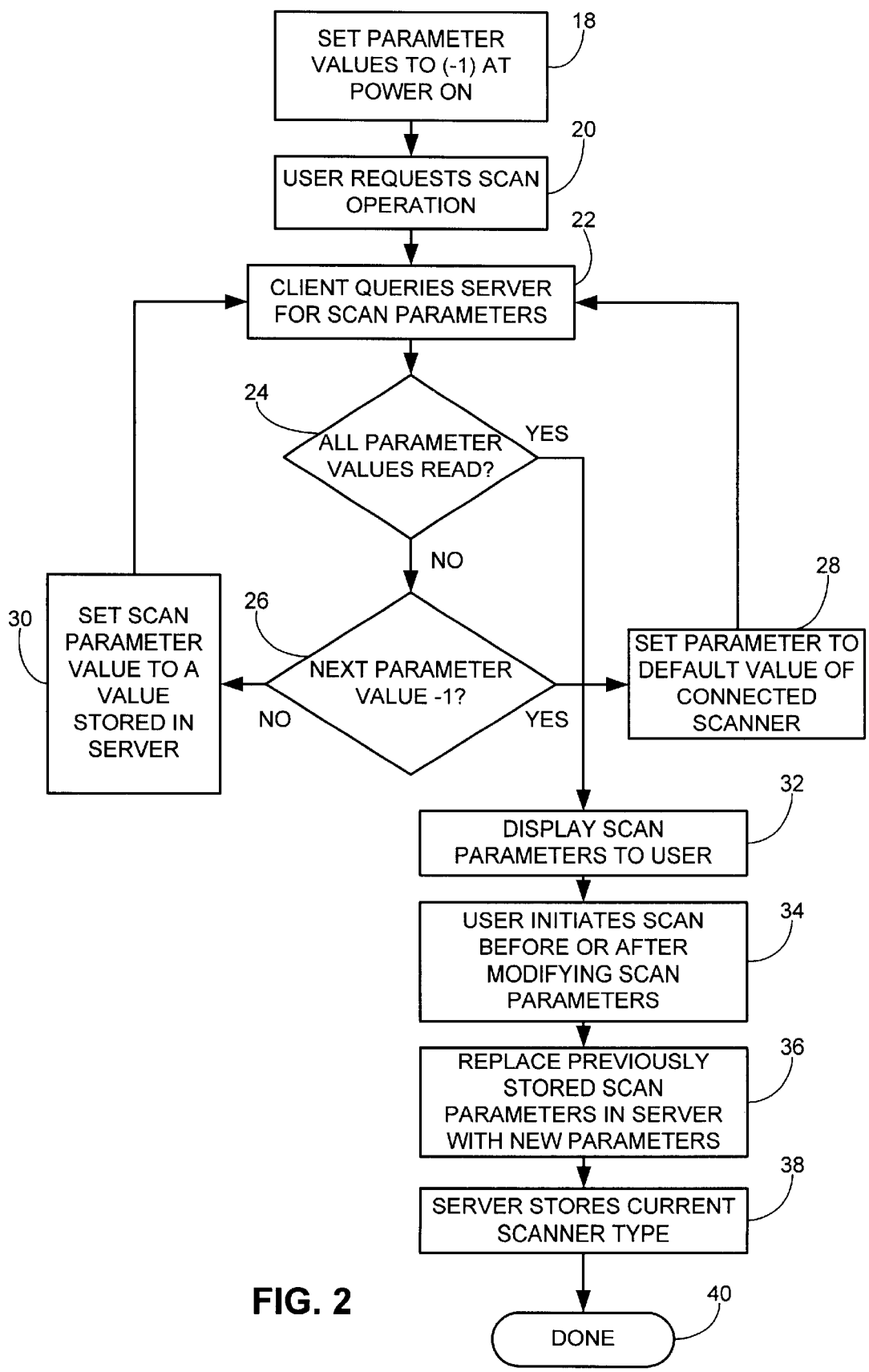
FIG. 2 is a flowchart illustrating the method for automatically repeating the previous scan operation in the network system of FIG. 1 in accordance with the present invention; and, FIG. 3 is a flowchart illustrating the method for determining whether the scan parameters used in the previous scan operation should be retained or changed to the default setting of the newly connected peripheral based on the type of the new peripheral.

Turning now to FIG. 2, the preferred method for repeating a scan operation is illustrated in accordance with the present invention. When the server 10 is initially powered on, each of the scan parameters stored in the management information base (MIB) of the server is reset to a value of −1 (block 18). In the preferred embodiment, there are four scan parameters which correspond to paper size, image type, image format and resolution in dots per inch (dpi). Accordingly, the four MIB values are all set to −1, which sets the scan parameters to the default settings of the scanner 16, as will be further described below. It should be noted that more or less than four scan parameters may be provided to suit the particular needs of the user and/or the peripheral. When the user requests a scan job from the scanner 16 (block 20), the client 12 queries the server 10 for the scan parameters stored in the server (block 22). The preferred protocol for querying the server 10 is Simple Network Management Protocol. However, other known protocols are contemplated. The scan job request is made through a suitable user interface (UI) provided in the client 12.

The client 12 then determines whether all the scan parameters have been read from the server 10 (block 24). If not all the parameters have been read, it is determined whether the value of the next parameter is −1 (block 26). If it is −1, the user interface of the client 12 sets that parameter to the default value of the scanner 16 presently connected to the server 10 (block 28). If, however, the value of the next parameter is not −1, the user interface of the client 12 sets that parameter to the value stored in the server (block 30). In either case, the process goes back to block 22, where the client 12, queries the server 10 for the next scan parameter.

If it is determined at block 24 that all the scan parameters have been read, the user interface of the client 12, displays the scan parameters to the user (block 32). The user then has the option to modify the displayed scan parameters to the desired settings through the user interface and initiate the scan operation (block 34). Once the scan operation is initiated, the user interface sends the scan parameters to the server 10, which stores the parameters, replacing the previously stored MIB values (block 36). The server 10 also identifies the type of the currently attached scanner 16 and stores the scanner type in the memory of the server (block 38). The scan operation is ten completed (block 40).

Anytime the server 10 detects that the scanner 16 connected to the server is powered on or that the scanner has been disconnected and reconnected to the server, the server determines whether this "new" scanner is in the same family as the scanner which performed the last scan operation. A scanner is said to be in the same family if it can accept all the same scan parameters and uses the same scan protocol as all the other scanners in that family. It is important to determine the family of the new scanner 16 because the scan parameters stored in the MIB of the server 10 may not be appropriate for the new scanner. Generally, the stored parameters can be used to repeat the last scan job even when the new scanner 16 is of a different type but still within the same family.

Figure 3:
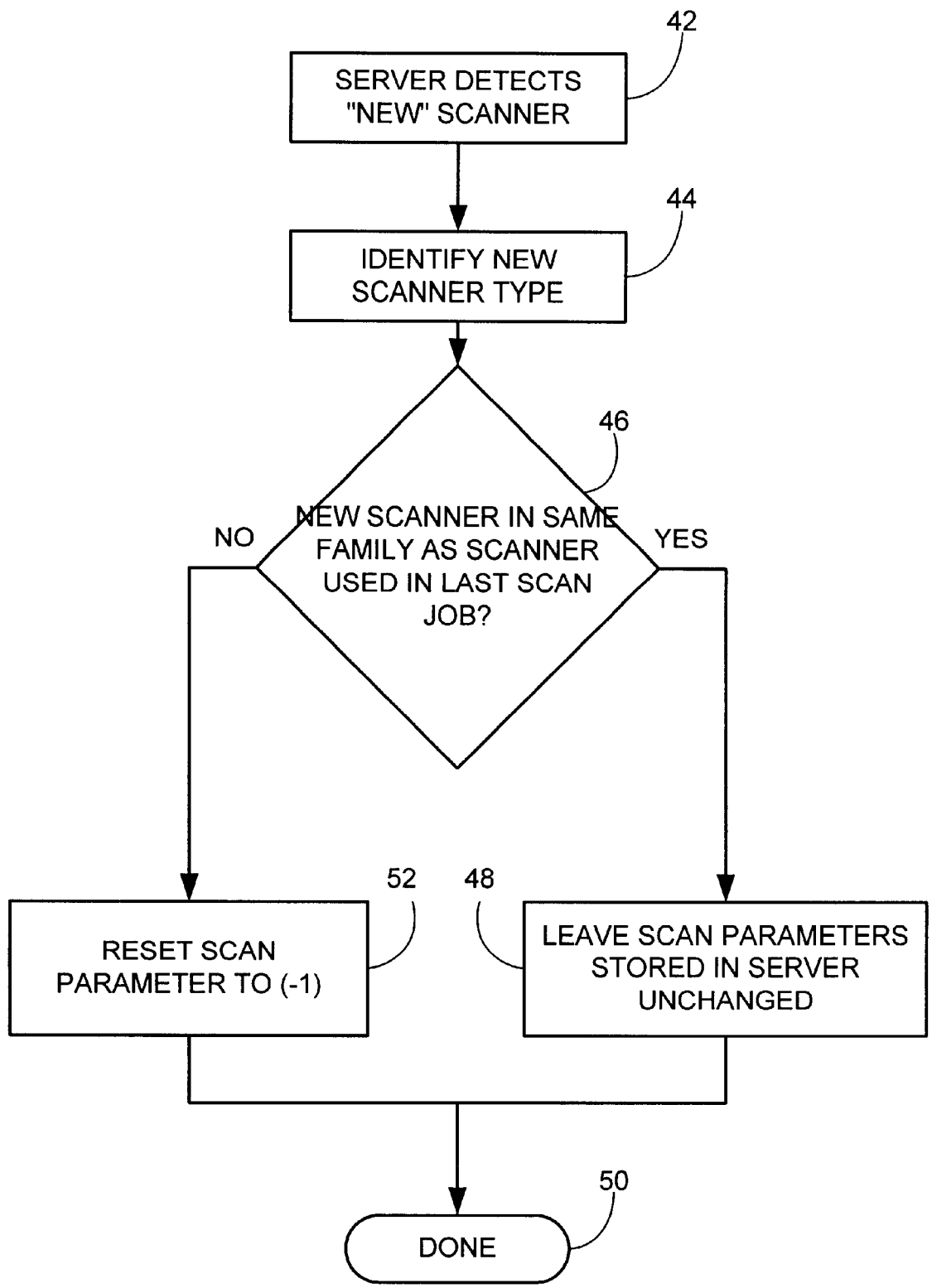

Turning now to FIG. 3, the family type is determined whenever the server 10 detects what it considers to be a new scanner 16, as when the currently connected scanner is powered on or when the scanner is disconnected and reconnected to the server (block 42). The server 10 then checks the device identification string of the new scanner 16 to determine its type (block 44), which is compared with the scanner type previously stored in the server (see block 38 above). If the new scanner 16 is the same type or in the same family as the scanner type stored in the server memory, the scan parameters of the last scan operation stored in the server 10 are unchanged (block 48), and the process is ended at this point (block 50). However, if the new scanner 16 is not in the same family as the scanner type stored in the server memory, the scan parameters stored in the MIB of the server memory are reset to −1 (block 52), and the process is ended (block 50). Resetting the scan parameters values to −1 has the effect of changing the scan parameters to the manufacturers' default setting of the scanner 16, as described above in blocks 26, 28 and 32.

From the foregoing description, it should be understood that an improved method for performing a scan operation has been shown and described which has many desirable attributes and advantages. The present invention enables the user to repeat a scan operation without having to manually change the scan parameters to the desired settings. The present invention also determines the type of the scanner each time the scanner is powered on or disconnected and reconnected, so that it can be determined whether the connected scanner is in the same family as the scanner that performed the last operation. The scan parameters stored in the server is then used in performing the repeat scan operation if the connected scanner is in the same family.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for repeating a previous scan operation in a network including a server connected to at least one scanner and at least one client, said method comprising the steps of:

saving scan parameters of a previous scan operation preformed by a particular scanner, said parameters having been received by the server from the client responsive to receipt of a request from the client to perform the previous scan operation;

retrieving said scan parameters of the previous scan operation responsive to receipt of a client query from the server for scan parameters for a present scan operation; and initiating said present scan operation using said scan parameters of the previous scan operation.

2. The method according to claim 1 wherein said scan parameters of the previous scan operation are saved in the server.

3. The method according to claim 2 wherein said scan parameters of the previous scan operation are stored as management information base (MIB) values.

4. The method according to claim 1 wherein the client sends said scan parameters of the previous scan operation, said request to perform the previous scan operation and said query to the server via a user interface of the client.

5. The method according to claim 1 further comprising the step of storing a scanner type of a scanner which performed the previous scan operation when said request to perform the previous scan operation is received from the client.

6. The method according to claim 1 wherein the scanner is one of a scan peripheral and a multifunction peripheral.

7. The method according to claim 1 wherein default scan parameters are retrieved at said retrieving step for any of said scan parameters of the previous scan operation when said any of said scan parameters are not available.

8. The method according to claim 7 further including the step of displaying one of said scan parameters of the previous scan operation and said default scan parameters to a user after said retrieving step.

9. The method according to claim 8 wherein said scan parameters of the previous scan operation and said default scan parameters are displayed by a user interface of the client.

10. A server for operating at least one scanner in a network having at least one client, said server being connected to the scanner via the network and adapted to repeat a previous scan operation, said server comprising:

means for storing scan parameters of the previous scan operation performed by a particular scanner, said parameters having been received from the client responsive to receipt of a request from the client to perform the previous scan operation;

means for determining whether a present scanner connected to the server is in a same family as said particular scanner which performed the previous scan operation, when said present scanner is powered on and connected to said server;

means for providing said scan parameters of the previous scan operation to the client when said present scanner is in said same family as said scanner which performed the previous scan operation, responsive to a client query to said server for scan parameters for a present scan operation; and, means for initiating said present scan operation using said scan parameters of the previous scan operation responsive to a request for said present scan operation from the client.

11. A method for repeating a previous scan operation in a network including a server connected to at least one scanner and at least one client, said method comprising the steps of:

saving scan parameters of a previous scan operation performed by a particular scanner, said parameters having been received by the server from the client responsive to receipt of a request from the client to perform the previous scan operation;

determining whether a present scanner connected to the server is in a same family as said particular scanner which performed the previous scan operation, when said present scanner is powered on and connected to said server;

retrieving said scan parameters of the previous scan operation when said present scanner is in said same family as said scanner which performed the previous scan operation, and retrieving default scan parameters when said present scanner is not in said same family as said scanner which performed the previous scan operation; and, initiating said present scan operation using said scan parameters of the previous scan operation when said present scanner is in the same family as said scanner which performed the previous scan operation, and initiating said present scan operation using said default scan parameters when said present scanner is not in the same fly as said scanner which performed the previous scan operation.

12. The method according to claim 11 wherein said scanner type and said scan parameters of the previous scan operation are saved in the server.

\* \* \* \* \*

UNITED STATES PATENT AND TRADEMARK OFFICE
CERTIFICATE OF CORRECTION

PATENT NO. : 6,535,914 B1
DATED : March 18, 2003
INVENTOR(S) : Daniel R. Pearson et al.

It is certified that error appears in the above-identified patent and that said Letters Patent is hereby corrected as shown below:

Column 3,
Line 47, delete "ten" and insert therefor -- then --

Column 4,
Line 42, delete "preformed" and insert therefor -- performed --

Column 6,
Line 29, delete "fly" and insert therefor -- family --

Signed and Sealed this

Twenty-second Day of March, 2005

JON W. DUDAS
*Director of the United States Patent and Trademark Office*